May 20, 1952  R. COUCHMAN  2,597,706
LUBRICATED ELECTRICAL CONDUIT
Filed June 25, 1948
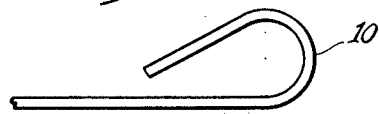
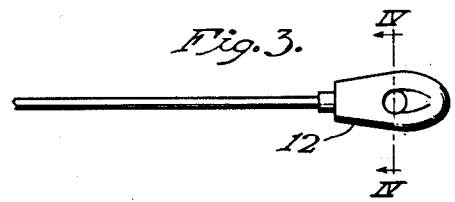
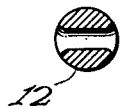
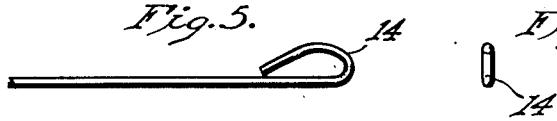
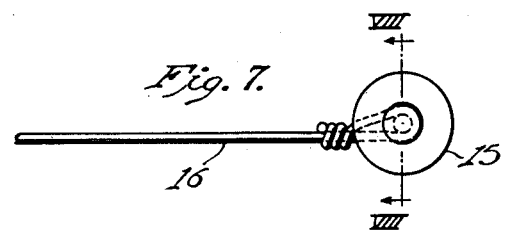
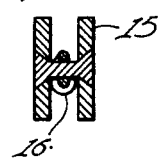
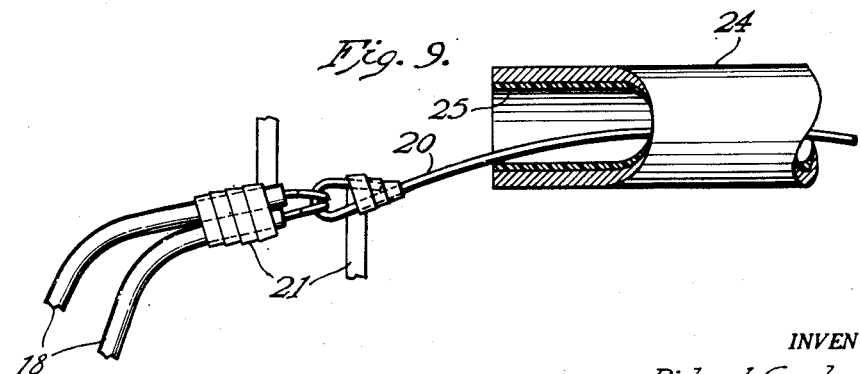
INVENTOR.
Richard Couchman.
BY
ATTORNEY

Patented May 20, 1952

2,597,706

UNITED STATES PATENT OFFICE 2,597,706

LUBRICATED ELECTRICAL CONDUIT

Richard Couchman, New Kensington, Pa., assignor, by mesne assignments, to the People of the United States of America Application June 25, 1948, Serial No. 35,157

1 Claim. (Cl. 174—68)

This invention relates in general to the manufacture of electrical conductor conduit or tubing and is more particularly directed to methods of treating or processing the interior surface of aluminum alloy conduit employed to encase or house electrical conductor wires.

Coincident with the acceptance and increased use of aluminum alloy tubing, as a substitute for steel conduit and other competitive metals and alloys, it was discovered that considerable difficulty was experienced in threading and pulling conductor wires through the tubing following the established technique with known and accepted electrician's tools and fish tapes.

An extensive test program confirmed the reported difficulty and resulted in the development of a texturing method for application of a lubricating film on the interior surface of aluminum alloy tubing, or conduit, which has made this material the full equivalent of, and in many cases superior to, established metals and alloys in the electrical conduit field, insofar as the use of technique and fish tapes employed with other types of conduit are concerned.

It is the general object of the invention to provide a texturing method for the interior of aluminum alloy tubing or conduit that will eliminate the sticking tendency experienced in threading and pulling fish tapes and similar tools therethrough.

Another object is to provide an aluminum alloy tubing or conduit having an interior surface lubricating film adhered thereon.

Other more specific objects and advantages will be recognized by those skilled in this art on consideration of the following specification and claims, when read in conjunction with the illustrations, in which:

Fig. 1 illustrates a fragmentary portion of the leading end of an electrician's fish tape;

Fig. 2 illustrates an end elevational view of the fish tape represented in Fig. 1;

Fig. 3 illustrates a fragmentary portion of the leading end of another type of electrician's fish tape;

Fig. 4 illustrates a sectional elevation taken on the line IV—IV of Fig. 3;

Fig. 5 illustrates a fragmentary portion of the leading end of an improvised form of electrician's fish tape;

Fig. 6 illustrates an end elevational view of the fish tape represented in Fig. 5;

Fig. 7 illustrates a fragmentary portion of the leading end of a modified form of electrician's fish tape;

Fig. 8 illustrates a sectional elevation taken on the line VIII—VIII of Fig. 7; and Fig. 9 illustrates a fragmentary view in partial section, and with parts broken away, of a conduit threading operation.

A standard form of fish tape is represented in Figs. 1 and 2. This particular fish tape is used extensively by electricians for threading and pulling electrical conductor wires through rigid metallic tubing in normal electrical installations. The tape is made in the form of a flexible steel ribbon, one widely used size being approximately 0.045" x ⅛" in cross section, and is provided at one or both ends with a bent loop or eye 10 for introduction into a conduit and attachment to a conductor, or series of conductor wires, as a means for drawing the same through the conduit.

Figs. 3 and 4 represent a terminal ball type of fish tape which is quite similar to that illustrated in Fig. 1, except that it is equipped with a rigidly attached, bullet shaped nose 12 at one or both ends thereof. The nose piece 12, when employed at both ends of the tape, is perforated to facilitate attachment of conductor wires to be drawn through the conduit.

Figs. 5 and 6 illustrate the simplest form of fish tape that is quite often fabricated and improvised on the job. It comprises a suitable length of galvanized steel wire with one or both ends bent to form small loops or eyes 14.

In Figs. 7 and 8, a slight departure from the fish tapes previously described has been illustrated. Herein a flexible wire 16 is shown which has a brass roller 15 rotatably attached to the leading end thereof. Similar rollers may also be rotatably attached at intervals along its length, an additional steel wire being added between succeeding rollers to increase the rigidity of the tape from its leading towards its trailing end. Various modifications of this form of specialized fish tape are commercially available.

Regardless of the particular type of fish tape selected for a conduit threading operation, the normal practice consists in introducing the leading end of the fish tape into the open end of the conduit and pushing it through the same to a position where it can be grasped by the electrician at a point removed from the end at which it was introduced. Fish tapes are made from flexible, high strength steel wire stock and tapes 50 feet in length are quite common, as are many runs of installed conductor conduit. The conductor wire or wires to be installed within a conduit are connected to the rear end of the fish tape, which is normally equipped with a suitable loop or eye at its trailing end, and are subsequently drawn through the conduit by exerting pull on the leading end of the fish tape.

Fig. 9 represents such an operation wherein the conductor wires 18, which may be standard No. 14 insulated wires, are connected to the trailing end of a fish tape 20, which has been previously pushed through a length of installed aluminum alloy tubing or conduit 24. The usual manner of connecting the conductors to the trailing end of a fish tape comprises stripping or removing a portion of the conductor insulation, forming a hook in the conductor wire proper, and passing the formed hook through the loop or eye on the trailing end of the fish tape. A conductor-to-fish tape connection thus made is preferably encased by wrapping electric friction tape 21 around the same to insure against uncoupling of the connection, as well as prevent exposed or protruding wire ends. This mode of attachment between one or a series of electrical conductors and the trailing end of a fish tape represents a recognized practice in the electrical field, as is the dusting of talc or soapstone on the exterior surface of the friction tape, and/or insulated conductor wires, to prevent their sticking.

In accordance with the invention, the aluminum alloy tubing or conduit 24 is provided on its interior surface with an adherent film 25 of lubricant, which will now be described in more detail.

Following the extensive tests, referred to in the fore part of the specification, it was discovered that aluminum alloy tubing or conduit could be textured on its interior surface, through the application of an adherent lubricating film 25, and become the full equivalent of competitive metals in the electrical conductor conduit field. Several possibilities presented themselves in this connection, but it was found that a texturing film giving the desired results, and free from any deleterious affects on the aluminum alloys and normally employed insulated conductor wires, included compounds containing the fatty acids having the general formula $C_nH_{2n}O_2$, where $n$ is greater than 10. Of this general class of fatty acids, palmitic acid ($C_{16}H_{32}O_2$), or stearic acid ($C_{18}H_{36}O_2$), or mixtures thereof conventionally termed stearin in commerce, have been successfully employed and have made it possible to thread accepted types of fish tapes and conductor wires through aluminum alloy conduit with the same ease associated with steel and other competitive tubing, which, in the case of steel conduit, under the National Electric Code, is required to be interiorly enamelled. In this connection, interior enamelling of aluminum alloy tubing did not eliminate the sticking characteristic, nor did the substitution of various materials, such as stainless steel, zinc and/or oilite bearing stock, for the material of the ball and roller in the fish tapes illustrated in Figs. 3 and 7, remove the threading difficulty experienced with aluminum alloy conduit.

In accordance with the practice of the invention, the aluminum alloy tubing to be textured for subsequent use with commercial types of conductors and fish tapes is first thoroughly cleaned to remove manufacturing dirt and lubricant. This is usually accomplished by dipping, spraying or force flushing with kerosene, or similar liquid, followed by a drying operation. The tubing is next processed by flowing a texturing solution through the same, sufficient agitation between the tubing and texturing solution being maintained to insure complete interior surface contact.

A wide range of texturing solutions may be used in the practice of the invention, such for example as, solutions containing 50 to 600 grams of a fatty acid responding to the general formula $C_nH_{2n}O_2$, where $n$ is greater than 10, in about 1 to 20 gallons of a volatile hydrocarbon, such as mineral spirits. Waxes, such as beeswax, spermaceti wax, carnauba wax, or other esters of the higher saturated monatomic alcohols of the higher fatty acids, may be added to the above texturing solutions in varying amounts without in any way impairing the lubricating and/or texturing value of the general formula fatty acids.

A preferred texturing solution comprises 300 grams of $C_nH_{2n}O_2$, where $n$ is greater than 10, dissolved in 5 gallons of a suitable hydrocarbon, with or without the addition of a varying amount of one or more of the waxes mentioned above. Commercial stearic acid is preferably employed in a solution of mineral spirits such as sold under the trade names "Skellysolve" or "Sunoco Spirits." Any volatile hydrocarbon may be used in combination with any of the fatty acids, or mixtures thereof, answering to the general formula given above. Following exposure of the interior surface of the aluminum alloy conduit to the described solution, or solutions, a drying or volatilizing step is carried out whereby excess liquid is driven off which leaves the thin film 25 of lubricant on the interior wall of the tubing. Heat may be used to shorten the drying period, and periods of 10 to 30 seconds contact between the tubing and texturing solution have been found satisfactory. The resulting film of lubricant is hard, tenacious and capable of taking bends in electrical conduit, as well as resisting the sticking and abrasive tendency of fish tapes and conductor wires normally used in electrical conduit installations.

The texturing process herein above described may be employed with electrical conduit fabricated from metals and alloys other than aluminum and its alloys. Also, the term "aluminum alloy," as used in the specification and claim, is meant to include any alloys which contain 50% or more, by weight, of aluminum.

What is claimed is:

An electrical conduit installation comprising an aluminum alloy tubing, at least one insulated conductor within said tubing, and a lubricating film on the interior surface of said tubing, said lubricating film being characterized by being hard and tenacious and including a fatty acid responding to the general formula $C_nH_{2n}O_2$, where $n$ is greater than 10.

RICHARD COUCHMAN.

REFERENCES CITED

The following references are of record in the file of this patent:

UNITED STATES PATENTS

| Number | Name | Date |
|---|---|---|
| 817,086 | Murphy | Apr. 3, 1906 |
| 951,520 | Robinson | Mar. 8, 1910 |
| 1,714,184 | Moore | May 21, 1929 |
| 1,996,392 | Torrence et al. | Apr. 2, 1935 |

OTHER REFERENCES

"Chemical Abstracts," vol. 30, page 9985. (A copy is in Div. 6 of the Patent Office.)

"Utilization of Fats" (page 271) by H. K. Dean, published by A. Harvey, London 1938. (A copy is in Div. 63 of the Patent Office.)